(12) United States Patent
Mao et al.

(10) Patent No.: US 11,783,568 B2
(45) Date of Patent: Oct. 10, 2023

(54) OBJECT CLASSIFICATION USING EXTRA-REGIONAL CONTEXT

(71) Applicant: Waymo LLC, Mountain View, CA (US)

(72) Inventors: Junhua Mao, Palo Alto, CA (US); Qian Yu, Belmont, CA (US); Congcong Li, Cupertino, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 17/224,763

(22) Filed: Apr. 7, 2021

(65) Prior Publication Data

US 2021/0326609 A1   Oct. 21, 2021

Related U.S. Application Data

(63) Continuation of application No. 16/230,187, filed on Dec. 21, 2018, now Pat. No. 10,977,501.

(51) Int. Cl.
*G06N 3/08* (2023.01)
*G06V 20/58* (2022.01)
(Continued)

(52) U.S. Cl.
CPC ......... *G06V 10/764* (2022.01); *G05D 1/0088* (2013.01); *G05D 1/0221* (2013.01);
(Continued)

(58) Field of Classification Search
CPC ...... G06V 20/58; G06V 10/50; G06V 10/764; G06V 10/82; G06V 10/454; G05D 1/0088;
(Continued)

(56) References Cited

U.S. PATENT DOCUMENTS

| | | |
|---|---|---|
| 5,311,600 A | 5/1994 | Aghajan et al. |
| 5,541,590 A | 7/1996 | Nishio |

(Continued)

FOREIGN PATENT DOCUMENTS

| | | |
|---|---|---|
| CN | 107449433 A | 12/2017 |
| CN | 107909151 | 4/2018 |
| JP | 2005339398 | 12/2005 |

OTHER PUBLICATIONS

PCT International Preliminary Report on Patentability in International Appln. No. PCT/US2019/067197, dated Jul. 1, 2021, 9 pages.

(Continued)

*Primary Examiner* — Sheela C Chawan
(74) *Attorney, Agent, or Firm* — Fish & Richardson P.C.

(57) ABSTRACT

Some aspects of the subject matter disclosed herein include a system implemented on one or more data processing apparatuses. The system can include an interface configured to obtain, from one or more sensor subsystems, sensor data describing an environment of a vehicle, and to generate, using the sensor data, (i) one or more first neural network inputs representing sensor measurements for a particular object in the environment and (ii) a second neural network input representing sensor measurements for at least a portion of the environment that encompasses the particular object and additional portions of the environment that are not represented by the one or more first neural network inputs; and a convolutional neural network configured to process the second neural network input to generate an output, the output including a plurality of feature vectors that each correspond to a different one a plurality of regions of the environment.

15 Claims, 7 Drawing Sheets

(51) Int. Cl.
  *G06V 10/764* (2022.01)
  *G05D 1/00* (2006.01)
  *G05D 1/02* (2020.01)
  *G06F 18/2413* (2023.01)
  *G06V 10/82* (2022.01)

(52) U.S. Cl.
  CPC ....... *G05D 1/0231* (2013.01); *G06F 18/2413* (2023.01); *G06N 3/08* (2013.01); *G06V 10/82* (2022.01); *G06V 20/58* (2022.01); *G05D 2201/0213* (2013.01)

(58) Field of Classification Search
  CPC .............. G05D 1/0221; G05D 1/0231; G05D 2201/0213; G06N 3/08; G06K 9/6272
  USPC ....... 382/103, 155, 156, 158, 159, 199, 181, 382/190, 195; 706/15, 16, 20, 25, 23, 706/902, 903, 906, 27, 31, 10, 17, 22, 26, 706/28, 18, 41
  See application file for complete search history.

(56) References Cited

U.S. PATENT DOCUMENTS

| | | | |
|---|---|---|---|
| 5,640,468 | A | 6/1997 | Hsu |
| 6,208,963 | B1 | 3/2001 | Martinez et al. |
| 6,404,920 | B1 | 6/2002 | Hsu |
| 7,672,920 | B2 | 3/2010 | Ito et al. |
| 8,649,932 | B2 | 2/2014 | Mian et al. |
| 9,015,093 | B1 | 4/2015 | Commons |
| 9,229,102 | B1 | 1/2016 | Wright et al. |
| 9,275,308 | B2 | 3/2016 | Szegedy et al. |
| 9,760,806 | B1 | 9/2017 | Ning et al. |
| 9,989,964 | B2 | 6/2018 | Berntorp et al. |
| 10,013,640 | B1 | 7/2018 | Angelova et al. |
| 10,013,773 | B1 | 7/2018 | Ogale et al. |
| 10,235,771 | B2 | 3/2019 | Rad et al. |
| 10,366,502 | B1 | 7/2019 | Li |
| 2003/0233233 | A1 | 12/2003 | Hong |
| 2005/0013486 | A1 | 1/2005 | Wiedemann et al. |
| 2007/0092297 | A1 | 4/2007 | Shimura et al. |
| 2010/0100275 | A1 | 4/2010 | Mian et al. |
| 2010/0169009 | A1 | 7/2010 | Breed et al. |
| 2012/0050021 | A1 | 3/2012 | Rao et al. |
| 2012/0300078 | A1 | 11/2012 | Ogata et al. |
| 2013/0250112 | A1 | 9/2013 | Breed |
| 2014/0169680 | A1 | 6/2014 | Tang |
| 2014/0210644 | A1 | 7/2014 | Breed |
| 2014/0368493 | A1 | 12/2014 | Rogan et al. |
| 2014/0368807 | A1 | 12/2014 | Rogan |
| 2015/0055821 | A1 | 2/2015 | Fotland |
| 2017/0039436 | A1 | 2/2017 | Chen et al. |
| 2018/0122114 | A1 | 5/2018 | Luan |
| 2018/0157963 | A1 | 6/2018 | Salti et al. |
| 2018/0173971 | A1* | 6/2018 | Jia ........................ G06N 3/0454 |
| 2018/0211403 | A1 | 7/2018 | Hotson et al. |
| 2019/0188572 | A1 | 6/2019 | Lanctot et al. |
| 2019/0384286 | A1* | 12/2019 | Muenster ............. B60W 50/14 |
| 2020/0125112 | A1 | 4/2020 | Mao |

OTHER PUBLICATIONS

Chen et al., "Once for All: A Two-Flow Convolutional Neural Network for Visual Tracking," IEEE Transactions on Circuits and Systems for Video Technology, Dec. 2018, 28(12):3377-3386.

Chen et al., "DeepDriving: Learning Affordance for Direct Perception in Autonomous Driving," Proceedings of the IEEE International Conference on Computer Vision, 2015, pp. 2722-2730.

developer.nvidia.com [online], "End-to-End Deep Learning for Self-Driving Cars," Aug. 17, 2016, retrieved on Aug. 24, 2018, retrieved from URL<https://devblogs.nvidia.com/deep-learning-self-driving-cars>, 16 pages.

Geiger et al., "Vision meets Robotics: The KITTI Dataset," International Journal of Robotics Research, Aug. 2013, pp. 1231-1237.

Hung et al., "Scene Parsing with Global Context Embedding," 2017 IEEE International Conference on Computer Vision, Oct. 2017, pp. 2650-2658.

Khosroshahi, "Surround Vehicles Trajectory Analysis with Recurrent Neural Networks," 2016 IEEE 19th International Conference on Intelligent Transportation Systems, Nov. 2016, pp. 2267-2272.

Li et al, "Vehicle Detection from 3D Lidar Using Fully Convolutional Network," CoRR, Aug. 2016, https://arxiv.org/abs/1608.07916, 8 pages.

medium.com [online], "Training a neural network in real-time to control a self-driving car," Dec. 10, 2016, retrieved on Aug. 24, 2018, retrieved from URL<https://medium.com/@tantony/training-a-neural-network-in-real-time-to-control-a-self-driving-car-9ee5654978b7>, 6 pages.

PCT International Search Report and Written Opinion in International Appln. No. PCT/US2019/067197, dated Apr. 2, 2020, 16 pages.

Pomerleau, "Neural Network Vision for Robot Driving," The Handbook of Brain Theory and Neural Networks, 1996, 22 pages.

princeton.edu [online], "Deep Learning for Self-driving Car," Oct. 2020, retrieved on Dec. 21, 2016, retrieved from URL <http://www.princeton.edu/~alaink/Orf467F14/Deep%20Driving.pdf>, 32 pages.

Rivals et al., "Real-Time Control of an Autonomous Vehicle: A Neural Network Approach to the Path Following Problem," 5th International Conference on Neural Networks and their Applications, 1993, 11 pages.

Santana et al., "Learning a Driving Simulator," arXiv 1608.01230v1, Aug. 2016, 8 pages.

Socher et al., "Convolutional-Recursive Deep Learning for 3D Object Classification," Advances in Neural Information Processing Systems, 2012, 9 pages.

Kudo et al., "Scene and Actions: Combining Multiple Deep Features for Human Action Recognition," IEICE Tech. Rep., Mar. 2016, 115(517):161-166 (with English abstract).

Office Action in Japanese Appln. No. 2021-534163, dated Aug. 23, 2022, 13 pages (with English abstract).

Decision to Grant a Patent in Japanese Appln. No. 2021-534163, dated Feb. 8, 2023, 5 pages (with English translation).

Office Action in Chinese Appln. No. 201980085315.1, dated Jun. 19, 2023, 21 pages (with machine English translation).

Office Action in European Appln. No. 19836914.2, dated Mar. 24, 2023, 8 pages.

Office Action in Korean Appln. No. 10-2021-7022961, dated Jul. 21, 2023, 15 pages (with English translation).

\* cited by examiner

OBJECT CLASSIFICATION USING EXTRA-REGIONAL CONTEXT

CROSS REFERENCE TO RELATED APPLICATION

This application is a continuation of U.S. application Ser. No. 16/230,187, filed Dec. 21, 2018, the contents of which are incorporated by reference herein.

BACKGROUND

This specification relates to autonomous vehicles, and more particularly, for example, to neural network systems configured to generate classifications of objects represented in data acquired by one or more sensors on a vehicle.

Autonomous vehicles include self-driving cars, boats, and aircraft. As used herein, autonomous vehicles may refer to either fully autonomous vehicles or semi-autonomous vehicles. Fully autonomous vehicles are generally capable of completely automated driving independent of a human operator, while semi-autonomous vehicles automate some driving operations but still permit or require human control or intervention to some degree. Autonomous vehicles use a variety of on-board sensors and computer systems to detect nearby objects and use such detections to make control and navigation decisions.

Some autonomous vehicles implement neural networks to aid in discerning information about their environments based on sensor data. Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Often, each neuron can receive one or more inputs and generates an output that is received by another neural network layer. The transformation operations of each layer can be carried out by one or more computers at one or more locations having installed software modules that implement the transformation operations.

SUMMARY

This specification describes systems, methods, devices, and techniques for training and using an object classification neural network system. The system can be configured to process sensor data representing measurements of an object of interest detected in the vicinity of an autonomous vehicle, and to generate a predicted object classification for the object. The system can process both "patches" of sensor data that are narrowly focused on the object of interest and a feature vector that represents context about a wider environment surrounding the object to generate the predicted object classification.

Some aspects of the subject matter described herein include a system implemented on one or more data processing apparatuses. The system can include an interface configured to obtain, from one or more sensor subsystems, sensor data describing an environment of a vehicle, and to generate, using the sensor data, (i) one or more first neural network inputs representing sensor measurements for a particular object in the environment and (ii) a second neural network input representing sensor measurements for at least a portion of the environment that encompasses the particular object and additional portions of the environment that are not represented by the one or more first neural network inputs; a convolutional neural network configured to process the second neural network input to generate an output, the output including a plurality of feature vectors that each correspond to a different one a plurality of regions of the environment; and an object classifier neural network configured to process the one or more first neural network inputs and a first of the plurality of feature vectors to generate a predicted classification for the particular object.

These and other implementations can optionally include one or more of the following features.

The interface can be configured to obtain a plurality of channels of sensor data from a plurality of corresponding sensor subsystems, and different ones of the first neural network inputs represent sensor measurements of the particular object from different ones of the plurality of channels of sensor data.

The second neural network input can represent a projection of at least the portion of the environment that encompasses the particular object and the additional portions of the environment that are not represented by the one or more first neural network inputs.

The projection represented by the second neural network input can include a projection of a point cloud derived from measurements of a light detection and ranging (LIDAR) sensor subsystem.

The second neural network input can represent one or more camera images having a collective field of view of the environment of the vehicle that is wider than a field of view of the environment represented by the one or more first neural network inputs.

The object classifier neural network can include a plurality of channel encoders and a classification portion, each channel encoder configured to independently process a different one of the first neural network inputs to generate an alternative representation of the sensor measurements represented by the first neural network input, the classification portion configured to process the alternative representations from the plurality of channel encoders and the first of the plurality of feature vectors to generate the object classification.

The vehicle can be an autonomous vehicle.

The system can further include a planning subsystem configured to process the predicted classification for the particular object and other data to plan a maneuver for the vehicle, wherein the vehicle is configured to perform the maneuver without human control.

The object classifier neural network can be configured to determine scores indicating likelihoods of the particular object being at least two of a vehicle, a pedestrian, a cyclist, a motorcyclist, a sign, a background, or an animal.

The first of the plurality of feature vectors that is processed by the object classification neural network along with the one or more first neural network inputs to generate the predicted classification for the particular object can be selected from among the plurality of feature vectors based on a correspondence between the first of the plurality of feature vectors and a region of the environment where at least a portion of the particular object is located.

Each of the plurality of feature vectors can represent information about regions of the environment of the vehicle beyond the particular region that corresponds to the feature vector, and the first feature vector represents information about regions of the environment of the vehicle beyond any region of the environment that encompasses the particular object.

Some aspects of the subject matter described herein include methods implemented by one or more data processing apparatuses. The methods can include actions involving obtaining, from one or more sensor subsystems, sensor data that describes an environment of a vehicle; generating, using the sensor data, (i) one or more first neural network inputs representing sensor measurements for a particular object in the environment and (ii) a second neural network input representing sensor measurements for at least a portion of the environment that encompasses the particular object and additional portions of the environment that are not represented by the one or more first neural network inputs; processing, with a convolutional neural network, the second neural network input to generate an output, the output including a plurality of feature vectors that each correspond to a different one a plurality of regions of the environment; and processing, with an object classifier neural network, the one or more first neural network inputs and a first of the plurality of feature vectors to generate a predicted classification for the particular object.

These and other implementations can optionally include one or more of the following features.

Processing the one or more first neural network inputs and the first of the plurality of feature vectors to generate the predicted classification for the particular object can include processing, with a plurality of channel encoders of the object classifier neural network, the one or more first neural network inputs to generate one or more alternative representations of the sensor measurements represented by the one or more first neural network inputs.

Processing the one or more first neural network inputs and the first of the plurality of feature vectors to generate the predicted classification for the particular object can further include processing, with a classifier portion of the object classification neural network, the one or more alternative representations of the sensor measurements represented by the one or more first neural network inputs and the first of the plurality of feature vectors to generate the predicted classification for the particular object.

The actions can further include obtaining a plurality of channels of sensor data from a plurality of corresponding sensor subsystems, wherein different ones of the first neural network inputs represent sensor measurements of the particular object from different ones of the plurality of channels of sensor data.

The actions can further include using the predicted classification for the particular object to plan a maneuver for the vehicle, and performing the maneuver with the vehicle according to the plan.

The actions can further include selecting the first of the plurality of feature vectors for use in generating the predicted classification for the particular object based on a correspondence between the first of the plurality of feature vectors and a region of the environment where at least a portion of the particular object is located.

Each of the plurality of feature vectors can represent information about regions of the environment of the vehicle beyond the particular region that corresponds to the feature vector, and the first of the plurality of feature vectors represents information about regions of the environment of the vehicle beyond any region of the environment that encompasses the particular object.

Other aspects of the subject matter described herein include systems that employ one or more processors and one or more computer-readable media encoded with instructions that, when executed by the one or more processors, cause performance of operations corresponding to the actions of the methods described herein. Additionally, some aspects are directed to the encoded computer-readable media itself.

Particular embodiments of the subject matter described in this specification can be implemented so as to realize one or more of the following advantages. An autonomous vehicle system can predict the types of nearby objects to improve understanding of its environment and make better driving and navigation decisions. By processing feature vectors representing context about a wider portion of the environment than just the portion of the environment where the object of interest is located, the accuracy of object classifications made by the system can be improved on average. Moreover, by generating a single context map in one pass through a context embedding neural network, the system can more efficiently use environmental context information to classify multiple objects located in the environment of a vehicle without needing to re-generate a context map and associated feature vectors for each object that is to be classified. Increasing efficiency can be particularly significant when the system is implemented on-board an autonomous vehicle because computational resources on the vehicle are limited and predictions need to be generated quickly. By augmenting the object classifications with context vectors as described herein, the classifications can be improved without large increases in prediction time and resource usage.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
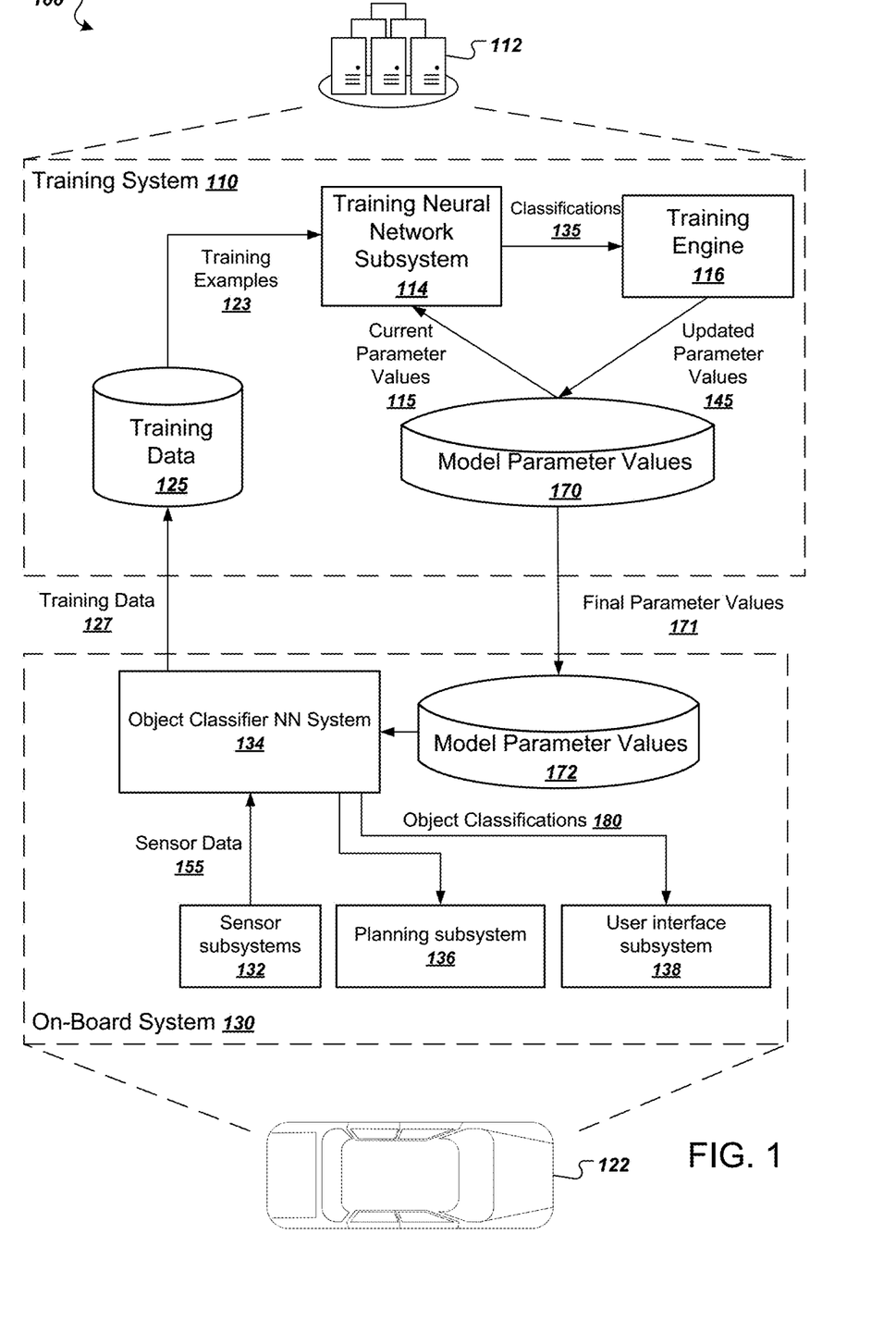
FIG. 1 is a diagram of an example system for training and using an object classification system on an autonomous vehicle.

FIG. 1 is a diagram of an example system 100. The system 100 includes a training system 110 and an on-board system 130. The on-board system 130 is physically located on-board a vehicle 122. The vehicle 122 in FIG. 1 is illustrated as an automobile, although the on-board system 130 can be located on any other suitable vehicle as well. Generally, the vehicle 122 is an autonomous vehicle capable of planning and executing driving actions (e.g., steering, braking, accelerating) fully or at least partially independent of human-directed operation or intervention. The vehicle 122 can use object classifications to make sense of its environment and plan driving actions that account for the types of objects that are in the vicinity of the vehicle 122 at any given time.

The on-board system 130 includes one or more sensor subsystems 132. The sensor subsystems 132 include components for sensing information about the vehicle's environment. One or more of the subsystems 132 can be configured to detect and process information about reflections of electromagnetic radiation emitted by particular ones of the subsystems 132, such as a light detection and ranging (LIDAR) subsystem that detects and processes reflections of laser light, a radio detection and ranging (RADAR) subsystem that detects and processes reflections of radio waves, or both. The sensor subsystems 132 can also include one or more camera subsystems that detect and process visible light. The camera subsystems can be monoscopic, stereoscopic, or other multi-view cameras that permit determination of object depths for objects shown in the image based on differences in spatial orientations/offsets of the cameras' image sensors. With respect to LIDAR and RADAR, the raw sensor data can indicate a distance, a direction, and an intensity of reflected radiation. For instance, each sensor can transmit one or more pulses of electromagnetic radiation in a particular direction and can measure the intensity of any reflections as well as the time that the reflections were received. A distance can be computed by determining a time delay between a pulse and its corresponding reflection. Each sensor can continually sweep a particular space in angle, azimuth, or both. Sweeping in azimuth, for example, can allow a sensor to detect multiple objects along a same line of sight.

The sensor subsystems 132 can provide one or more types of sensor data 155 to an on-board object classifier neural network system 134. The sensor data 155, for example, can include point-cloud data from LIDAR or RADAR subsystems, image data from camera subsystems, data from other sensor subsystems, or a combination of these. The sensor data can include multiple channels, and in some implementations each channel carries data corresponding to a different sensor subsystem 132. The object classifier neural network system 134 processes the sensor data 155 to generate an object classification 180. The object classification 180 indicates a prediction about a type or other category of an object of interest in a vicinity of the vehicle 122 (e.g., pedestrian, vehicle, sign, animal). Additional detail about an object classifier neural network system 134 is described with respect to FIGS. 3, 6, and 7.

In some implementations, the object classifier neural network system 134 provides object classifications 180 to other systems on the vehicle 122 and/or the classifications 180 are presented to a driver of the vehicle 122 to inform the systems or the driver about the types of objects that have been detected nearby the vehicle. For example, a planning subsystem 136 can use the object classifications 180 to make fully-autonomous or semi-autonomous driving decisions, thereby controlling the vehicle 122 based at least in part on the predicted classifications of the objects of interest. For example, the planning subsystem 136 can anticipate movements of certain objects and determine how to maneuver around other objects based on the classifications 180 provided by the object classifier neural network system 134.

The user interface subsystem 138 receives the object classifications 180, and can generate a graphical user interface that presents the locations of nearby objects with labels or other visual indicators describing the objects based on the classifications 180. An on-board display device can then display the user interface presentation for view by a driver or passengers of the vehicle 122.

The object classifier neural network system 134 can also use the sensor data 155 to generate training data 127. The on-board system 130 can provide the training data 127 to the training system 110 in offline batches or in an online fashion, e.g., continually whenever it is generated. The on-board system 130 can generate training examples for the training data 127 that characterize sets of sensor data 155. Each training example can then be labeled with an object classification representing the type of object that is the subject of each set of sensor data 115. Alternatively, the on-board system 130 can automatically generate classifications for the training data 127 from objects whose classifications can be determined by the on-board system 130.

The training system 110 is typically hosted within a data center 112, which can be a distributed computing system having hundreds or thousands of computers in one or more locations. Additional details about operations for training an object classifier neural network are described with respect to FIG. 7.

The training system 110 includes a training neural network subsystem 114 that can implement the operations of each layer of a neural network that is designed to make object classification predictions from sensor data. The training neural network subsystem 114 includes a plurality of computing devices having software or hardware modules that implement the respective operations of each layer of the neural network according to an architecture of the neural network. Generally, the training neural network subsystem 114 has the same architecture as the object classifier neural network system 134. However, the training system 110 need not use the same hardware to compute the operations of each layer. In other words, the training system 110 can use CPUs only, highly parallelized hardware, or some combination of these. For simplicity, this specification sometimes refers to the object classifier neural network system performing operations during training, but this does not necessarily imply that the same computers or hardware are employed for training and inference.

The training neural network subsystem 114 can compute the operations of each layer of the training neural network subsystem 114 (or object classifier neural network system 134) using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can generate, for each training example 123, predicted object classifications 135. A training engine 116 analyzes the object classifications 135 and compares the object classifications to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of parameter values 171 to the on-board system 130 for use in making object classifications 180 with the object classifier neural network system 134. The training system 110 can provide the final set of model parameter values 171 by a wired or wireless connection to the on-board system 130, for example.

Figure 2:
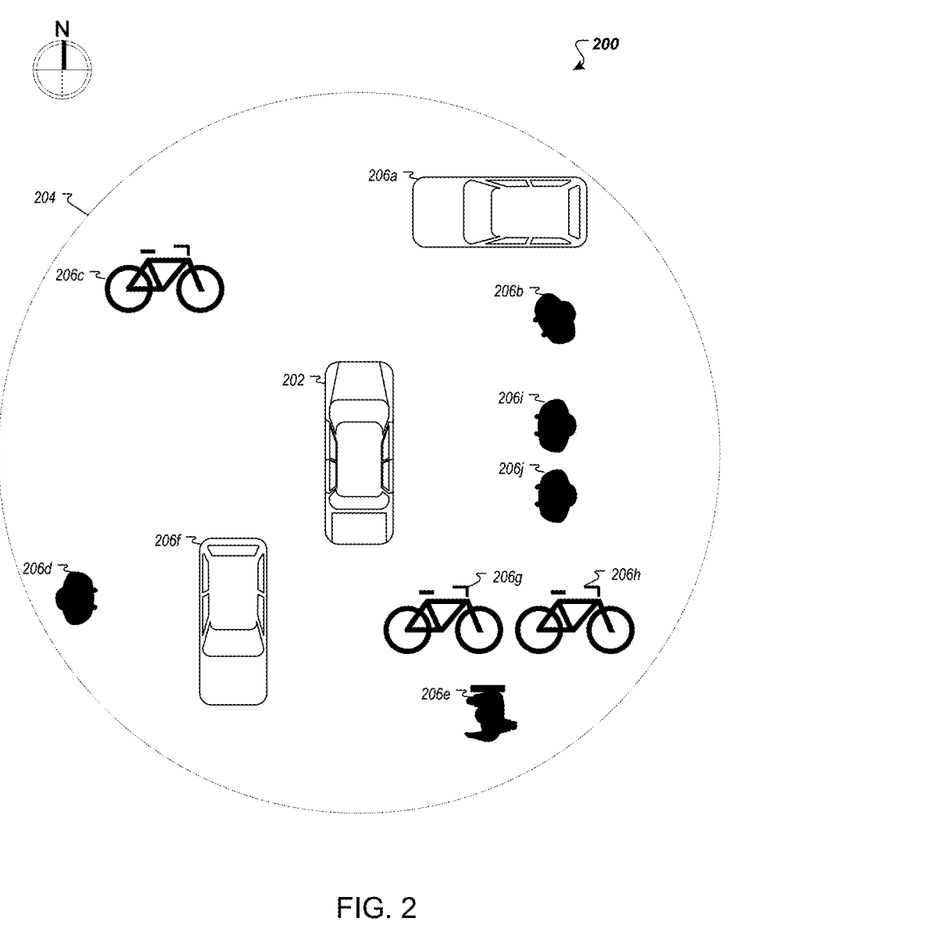
FIG. 2 is a diagram of an example environment of an autonomous vehicle.

FIG. 2 is a diagram of an example environment 200 of an autonomous vehicle 202. Sensors on the autonomous vehicle may constantly scan the environment 200, collecting measurements that can be used to inform driving decisions of the vehicle 202, including information about objects or obstacles in the environment 200 that the vehicle 202 should navigate around. For illustration, a boundary 204 is shown circumscribing a portion of the environment 200, with the autonomous vehicle 202 at its center. The boundary 204 represents sensing region for the vehicle 202. In some implementations, the extent of the sensing region is limited by the range of the sensors on the vehicle 202. Objects within the sensing region (e.g., the region encompassed by boundary 204) may be said to be nearby or in the vicinity of the vehicle 202. For example, several objects 206a-j are shown at various locations around the vehicle 202. The techniques disclosed herein can allow systems on an autonomous vehicle (e.g., vehicle 202) to detect and classify the various objects located in the environment near the vehicle.

Figure 3:
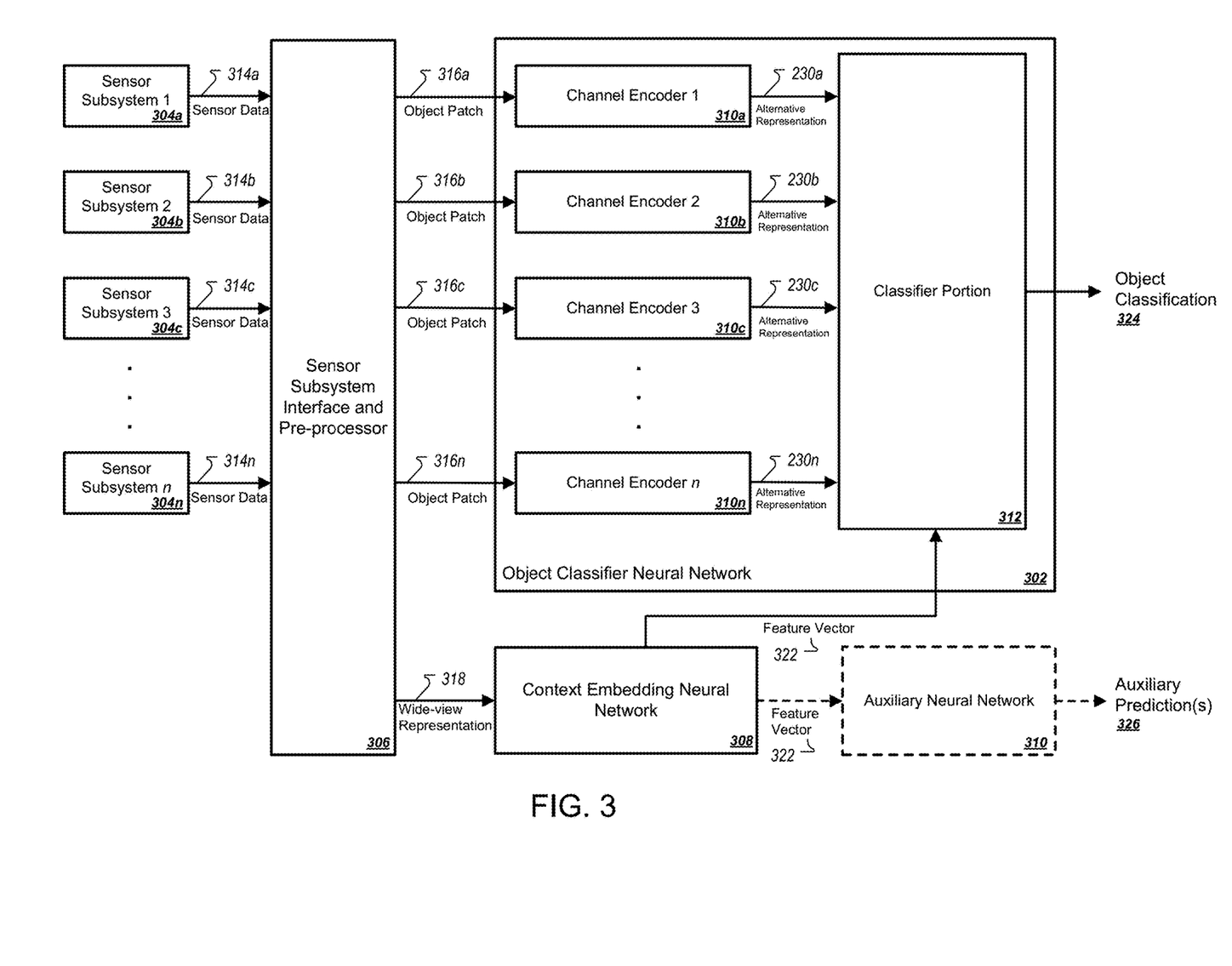
FIG. 3 is a diagram of an example object classification neural network system.

FIG. 3 is a diagram of an example system for object classification. An object classifier neural network system 302 is shown, which is configured to generate an object classification 324 for a detected object of interest. The object classifier neural network 302 can be implemented on an autonomous vehicle, e.g., as object classifier neural network system 134 (FIG. 1). In these implementations, the object classifier neural network 302 can determine classifications for objects within a vicinity of the vehicle, indicating for example whether an object is a pedestrian, a vehicle, a road sign, or another type of object. The vehicle can then make driving decisions based at least in part on the object classifications. For example, the vehicle may determine how close or far to move with respect to other objects in the environment or may predict movements of the objects based in part on each object's type or classification.

The neural networks depicted in FIG. 3 (e.g., object classifier neural network 302, context embedding neural network 308, and auxiliary neural network 310) can each include one or more computing devices having software and/or hardware modules that implement the respective operations of the various layers of the neural network according to an architecture, e.g., as depicted in FIG. 2. One or more of the networks can be implemented on common hardware in some cases. Additionally, the object classifier neural network 302 includes various sub-networks or portions that represent different sets of layers of the network 302. Different sub-networks or portions of a neural network may process inputs to generate outputs independently of other sub-networks or portions of the system. For example, as further explained in following paragraphs, the different channel encoders 310a-n can operate independently of the other encoders 310a-n and independently of the classifier portion 312. Moreover, the neural networks 302 and 310 can be purely feedforward networks, or may include recurrent and/or convolutional aspects within one or more portions of the system 200. The context embedding neural network 308 can be a convolutional neural network, or at least include convolutional layers.

The system of FIG. 3 is configured to generate an object classification 324 for an object of interest by processing one or more channels of sensor data 314a-n from one or more corresponding sensor subsystems 304a-n. For an autonomous vehicle, the sensor subsystems 304a-n may include, for example, LIDAR, RADAR, camera, and ultrasonic sensor subsystems that continuously process signals representing measurements of an environment surrounding the vehicle. Each sensor subsystem 304a-n is generally configured to monitor a different aspect of the vehicle's environment. For example, different subsystems 304a-n can be provided to obtain different types of measurements (e.g., images and LIDAR data), and different subsystems 304a-n can also be provided to obtain measurements of different portions of the environment (e.g., long-range vs. short-ranger LIDAR or cameras having different fields of view).

In one example, each sensor subsystem 304a-n corresponds to a different type of sensor (e.g., LIDAR, RADAR, camera, ultrasonic sensors), and the various sensor data channels 314a-n provide sensor data measurements of the environment from different types of sensors. Thus, sensor subsystem 304a may be a LIDAR system with the first channel sensor data 314a being LIDAR data representing laser measurements of the environment, while sensor subsystem 304b may be a camera system with the second channel sensor data 314b being image data representing one or more images captured by the camera system. In other examples, at least some of the sensor subsystems 304a-n are equipped with sensors of the same type, but the subsystems vary in other respects such as their respective areas of coverage.

The sensor subsystem interface and pre-processing subsystem 306 (or, "interface 306") is configured as an interface between the sensor subsystems and the neural networks 302, 308, and 310. The interface 310 receives the various channels of sensor data 314a-n from sensor subsystems 304a-n and generates, based on the sensor data, first neural network inputs 316a-n representing object patches for corresponding sensor channels and a second neural network input for a wide-view representation 318 of the environment of the autonomous vehicle. The object patches represented by the first neural network inputs 316a-n describe sensor measurements for a particular object in the vehicle's environment, i.e., an object of interest that the system has selected to be the subject of classification by the object classifier neural network 302. The interface 306, or another subsystem, can generate object patches for an object of interest, for example, by extracting measurements for the object of interest and cropping or isolating them from measurements for other portions of the environment represented in the sensor data 314a-n. The patches are thus substantially focused on the object of interest to the exclusion of other portions of the environment. The neural network inputs 316a-n are formatted in a suitable manner for processing by the object classifier neural network 302, such as an ordered collection of numeric values, e.g., a vector, a matrix, or a higher-order tensor of floating point or quantized floating point values, that represent the patches for each sensor channel. Additional detail about example sensor patches for an object of interest is described with respect to FIG. 4. Each object patch represented by the first neural network inputs is focused on the same object, but from a different perspective or different sensor type. For instance, a first pair of object patches may be generated based on data from a same LIDAR sensor subsystem but may represent projections of point-cloud data from different perspectives, and a second pair of object patches may be generated based on data from different sensor subsystems.

The wide-view representation 318 is a second neural network input that represents a larger area of the environment of the vehicle than the sensor patch. The wide-view representation 318 can describe measurements for the entire area of the environment measured by sensor subsystems 304a-n and indicated by the various channels of sensor data 314a-n. Alternatively, the wide-view representation 318 can describe measurements for less than the full extent of the sensing region surrounding the vehicle, but in any event the wide-view representation 318 encompasses a larger portion of the environment than the portion represented by the object patches in the first neural network inputs 316a-n. For example, the wide-view representation 318 can represent measurements of not just the object of interest but also of additional objects, background, or other areas of the environment that are not included in the object patches. In this sense, the wide-view representation 318 has a wider field of view of the environment than the object patches of inputs 316a-n, and thus the wide-view representation 318 can offer additional context about the environment surrounding an object of interest than the patches themselves. The second neural network input for the wide-view representation 318 can be formatted in a suitable manner for processing by the context embedding neural network 308, e.g., as an ordered collection of numeric values such as a vector or a matrix or a higher-order tensor of floating point or quantized floating point values. Additional detail about an example wide-view representation of an environment is described with respect to FIG. 5. In some cases, the amount of the environment represented by the wide-view representation 318 that corresponds to the object of interest is relatively small, for example less than 50, 35, 25, 15, 10, or 5 percent of the overall area of the environment encompassed by the wide-view representation 318.

The context embedding neural network 308 is configured to process the second neural network input for the wide-view representation 318 of the environment to generate a context map (not shown in FIG. 2). The context map is an embedding or data structure that characterizes features of the environment of the autonomous vehicle based on the wide-view representation 318 of the environment. In some implementations, the context map includes a collection of feature vectors, each feature vector corresponding to a different region of the vehicle's environment (e.g., regions represented by the collection of cells in the 4×5 grid depicted in FIG. 5). As a result of the convolutional architecture of the context embedding neural network 308 and the manner in which it is trained (described further with respect to FIG. 7), the feature vector for a given region describes features not only of that region but also of all or some other regions of the environment encompassed by the wide-view representation 318. Thus, the feature vector for a given region provides context about the environment of the vehicle beyond the particular region that corresponds to the feature vector. The context map and the individual feature vectors can be represented as an ordered collection of numeric values, e.g., a vector or a matrix or a higher-order tensor of floating point or quantized floating point values. In some implementations, the context map generated by context embedding neural network 308 is stored in a memory of the system for re-use in classifying more than one object in the vehicle's environment.

The object classifier neural network 302 is configured to process the first neural network inputs for patches 316a-n of the object of interest and a corresponding feature vector 322 from the context map to generate an object classification 324. In some implementations, the channel encoders 310a-n each process a different one of the first neural network inputs for a sensor channel corresponding to the encoder. For example, a first patch derived from LIDAR data may be processed by a first channel encoder and a second patch derived from a camera image may be processed by a channel encoder. The channel encoders 310a-n can process the patches represented by first neural network inputs 316a-n substantially independent of each other to generate alternative (encoded) representations 230a-n of the patches. The alternative representations 230a-n represent features of each patch that can be used in combination with features from the other patches and feature vector 322 to generate an object classification 324. The alternative representations 230a-n can be an ordered collection of numeric values, e.g., a vector or a matrix of floating point or quantized floating point values.

The classifier portion 312 of the object classifier neural network 302 is configured to process the alternative representations 230a-n for the patches of the object of interest and a feature vector 322 from the context map to generate the object classification 324. The classifier portion 312 can include multiple layers of operations that transform the inputs 230a-n and 322 to generate object classification 324. In some implementations, the classifier portion 312 is the first portion of the network 302 that combines data based on the first neural network inputs 316a-n, as well as the feature vector 322. The predicted object classification 324 can be represented as a single classification (e.g., an indication of the most likely classification from a set of possible classifications such as vehicle, pedestrian, cyclist, road sign, or animal), as a distribution of classifications (e.g., confidence or probability scores for each possible classification), or in any other appropriate representation.

The feature vector 322 processed by the classifier portion 312 can be selected from the set of feature vectors in the context map that was generated by the context embedding neural network 308. The system selects the feature vector 322 based on a location of the object of interest in the environment, i.e., a location of the object represented by the object patches in first neural network inputs 316a-n. In some implementations, the system (e.g., interface 308) selects the feature vector 322 that corresponds to the region of the environment where the object of interest is located. If the object of interest spans multiple regions, the system may select a feature vector 322 that corresponds to the region of the environment where the greatest portion of the object is located. Because the feature vector 322 provides additional context about the environment beyond the region where the object of interest is located, the classifier portion 312 can be trained to leverage this context to generate more accurate object classifications 324, in general.

For example, the object of interest may be a school bus, but due to conditions at the time the sensor data was acquired the object patches for the school bus do not clearly show some of the features of the school bus that distinguish it from other types of vehicles. In the absence of additional context, object classifier neural network 302 may be challenged to reliably predict that the object is a school bus rather than another type of vehicle. However, features such as children in the vicinity of the object of interest shown in other regions of the environment may be reflected in the feature vector 322, thus providing an additional signal to the classifier portion 312 that tends to indicate the object should be classified as a school bus.

As depicted in FIG. 2, the system can further include an auxiliary neural network 310. The auxiliary neural network 310 provides additional layers of operations following a last layer of the context embedding neural network 308, and is configured to process the same feature vector 322 for the region of the environment that corresponds to the location of the object of interest to generate one or more auxiliary predictions 326. The auxiliary predictions 326 can pertain to attributes or features of the vehicle's environment outside of, and optionally including, the corresponding region for the feature vector 322, i.e., outside the region where the object of interest is located (and outside the region encompassed by the object patches represented by first neural network inputs 316a-n). For example, one auxiliary prediction 326 may be a prediction for a total number of street signs (or other types of objects) located in the environment, or in each region of the environment, encompassed by the wide-view representation 318. Other auxiliary predictions 326 may pertain, for example, to a number of occluded objects, a number of pedestrians, a number of vehicles, or numbers of other types of objects located in the environment as a whole or in each region of the environment corresponding to the various feature vectors in the context map. In some implementations, the auxiliary predictions 326 can pertain to whether certain types of object are located in a region (e.g., whether a vehicle is located in the region, or whether a pedestrian is located in the region), attributes of each object located in the region (e.g., speed, heading of the object) and/or high-level semantics for the region such as whether there is a traffic jam, whether there is a pedestrian jaywalking in the region, whether there is an abnormally behaved vehicle in the region, and/or whether there is construction ongoing in the region. In some implementations, the auxiliary neural network 310 is employed only for the purpose of training the object classifier neural network 302 and context embedding neural network 308, but it is not used during the inference phase. Losses based on auxiliary predictions 326 can force the context embedding neural network 308 to learn to generate feature vectors that represent features of the environment outside of the region of interest (i.e., the region where the object of interest is located), although the auxiliary predictions 326 may not be used when the system is deployed on-board the autonomous vehicle. Additional detail about training the object classifier neural network 302 and the context embedding neural network 308 is described with respect to FIG. 7.

Figure 4:
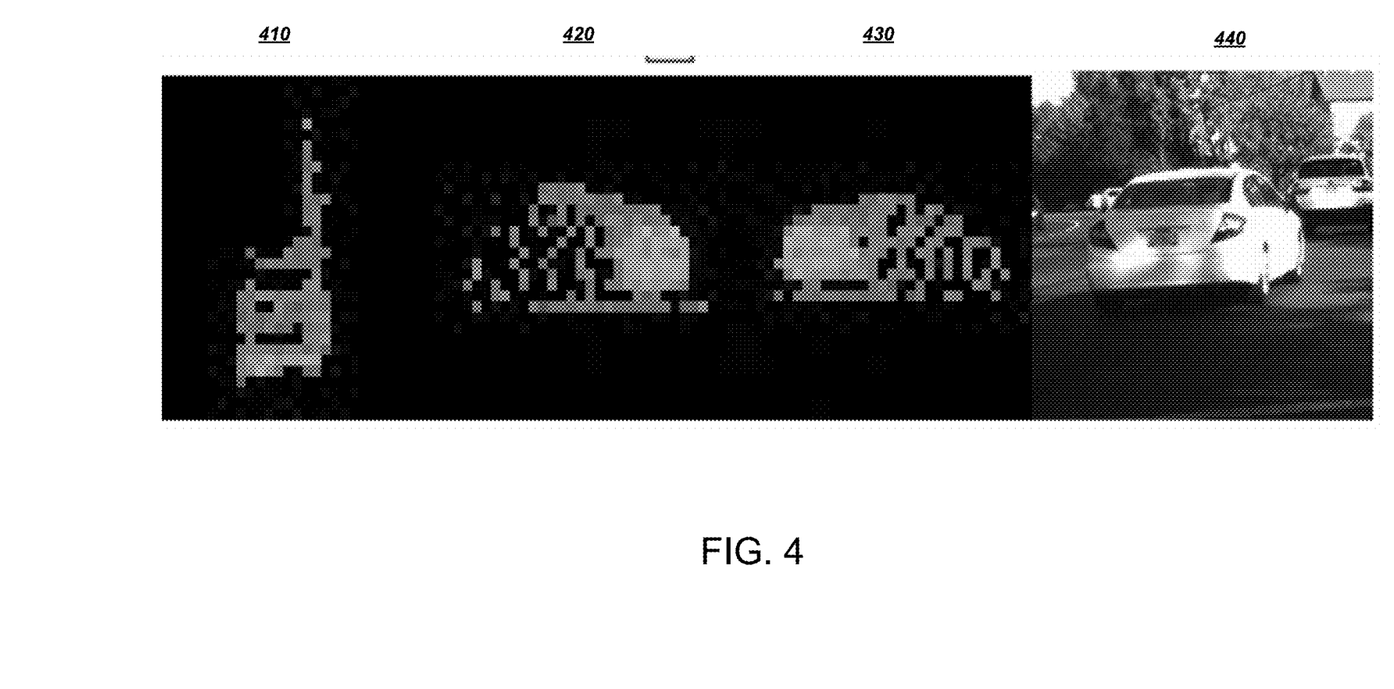
FIG. 4 illustrates example patches of sensor data for an automobile.

FIG. 4 depicts an example series of patches 410-430 for an object of interest, in particular an automobile (a white sedan) in this example, and a camera image 440 of the vehicle. The patches 410-430 have been cropped or extracted from point-cloud data based on measurements from a LIDAR sensor subsystem, and each patch shows the sedan from a different perspective. A "patch" generally refers to a portion of sensor data that focuses on a particular object, e.g., an object that is to be classified with an object classification neural network. A patch may be tightly focused on the particular object with all background or other objects surrounding the particular object removed from view, or the patch may have a less precise focus on the particular object. In some cases, even if not strictly focused on the object, the object still occupies a substantial portion of the field of view (e.g., at least 50-percent, 65-percent, 75-percent, or 90-percent of the field of view of the patch) of the patch. For example, an interface and pre-processor subsystem may obtain sensor data for a portion of an environment within sensing range of a vehicle, detect an object of interest near the vehicle, determine a bounding box (e.g., a rectangular box) around the object, and extract the content of the bounding box to form a patch for the object of interest. The bounding box may be drawn tightly around the object of interest, although other objects or background may not be entirely cropped from the patch due to processing limitations, for example.

In some implementations, the-onboard sensor subsystems or another system, e.g., sensor subsystem interface and pre-processor 306, can generate projections of point cloud data. A first type of projection is a top-down projection as shown in patch 410. A top-down projection is a projection of the point cloud data onto a region surrounding the vehicle from a location above the vehicle itself. The projection plane for a top-down projection is thus substantially parallel to the surface on which the vehicle is standing. Patches 420 and 420 illustrate a pair of perspective projections 420 and 430. A perspective projection is a projection of the point cloud data onto a plane in front of, behind, or to the side of the vehicle. The projection 420 is a perspective projection with the projection plane situated to the back left of the white car. The projection 430 is a perspective projection with the projection plane situated to the back right of the white car. In this projection, the intensity of the electromagnetic reflections is typically the most intense off the back of the car, which is information that will be reflected in intensity of the points in the point cloud data.

The system can represent each projection as a matrix of data, with each element of the matrix corresponding to a location on the projection plane. Each element of the matrix can have a respective value representing the intensity of the sensor measurement for that point. The system may, but need not, represent each projection with image data in an image format. In some implementations, the system uses different pixel color channels to represent the different aspects of the point cloud data. For example, the system can use RGB color values to represent intensity, range, and elevation, respectively for each point in the projection of point cloud data.

Figure 5:
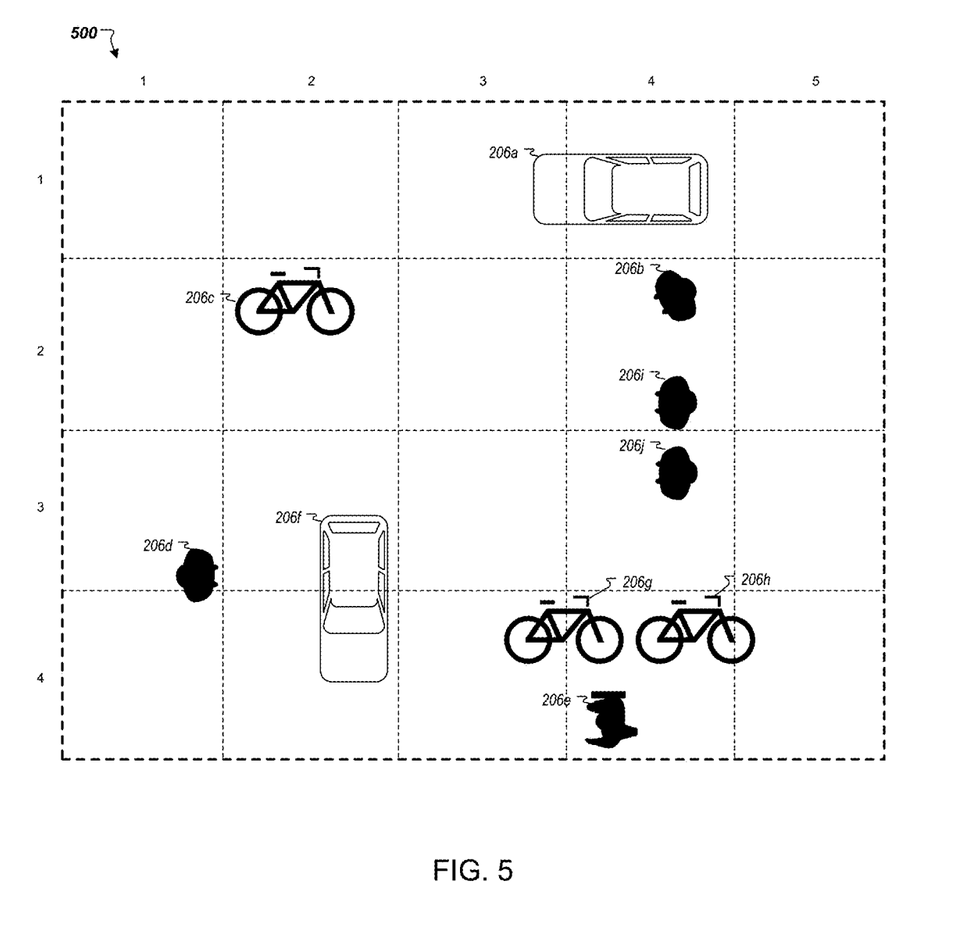
FIG. 5 is a diagram of an example wide-view representation of an environment of an autonomous vehicle.

FIG. 5 depicts an example wide-view representation 500 of an environment of a vehicle, e.g., autonomous vehicle 122 or 202. The wide-view representation 500 in this example shows the environment from a top-down perspective. The host vehicle (e.g., autonomous vehicles 122 or 202) is not shown in this view, but can generally be located at the center of the field of view when the representation 500 captures information about the environment in all directions surrounding the vehicle. The wide-view representation 500 can encompass the entire environment within sensing range of the vehicle, or may encompass only a portion of the environment within the sensing range of the vehicle. In some implementations, the wide-view representation 500 is a top-down projection of a point cloud based on LIDAR measurements. In some implementations, the wide-view representation 500 is a camera image of a portion of the environment. The wide-view representation 500 can also include multiple channels representing data from different sensor subsystems, or can be a composite of multiple channels of data. The system can also impose virtual boundaries (represented by the internal dashed lines) within the wide-view representation 500 to segment the wide-view representation 500 into multiple regions. For example, FIG. 5 shows a grid of twenty regions across four rows and five columns. Various objects 206a-j in the environment can then be classified as belonging to one or more regions. For instance, two persons 206b and 206i are located in the region at row 2, column 4, and vehicle 206a has a major portion located in the region at row 1, column 4 and a minor portion located in the region at row 1, column 3. When processing the wide-view representation 500 to provide context for classifying an object of interest, a feature vector may be generated for each region. Notably, although FIG. 5 shows the environment from a top-down perspective, in some implementations other perspectives can be employed such as a perspective projection of a LIDAR point cloud and/or a camera image.

Figure 6:
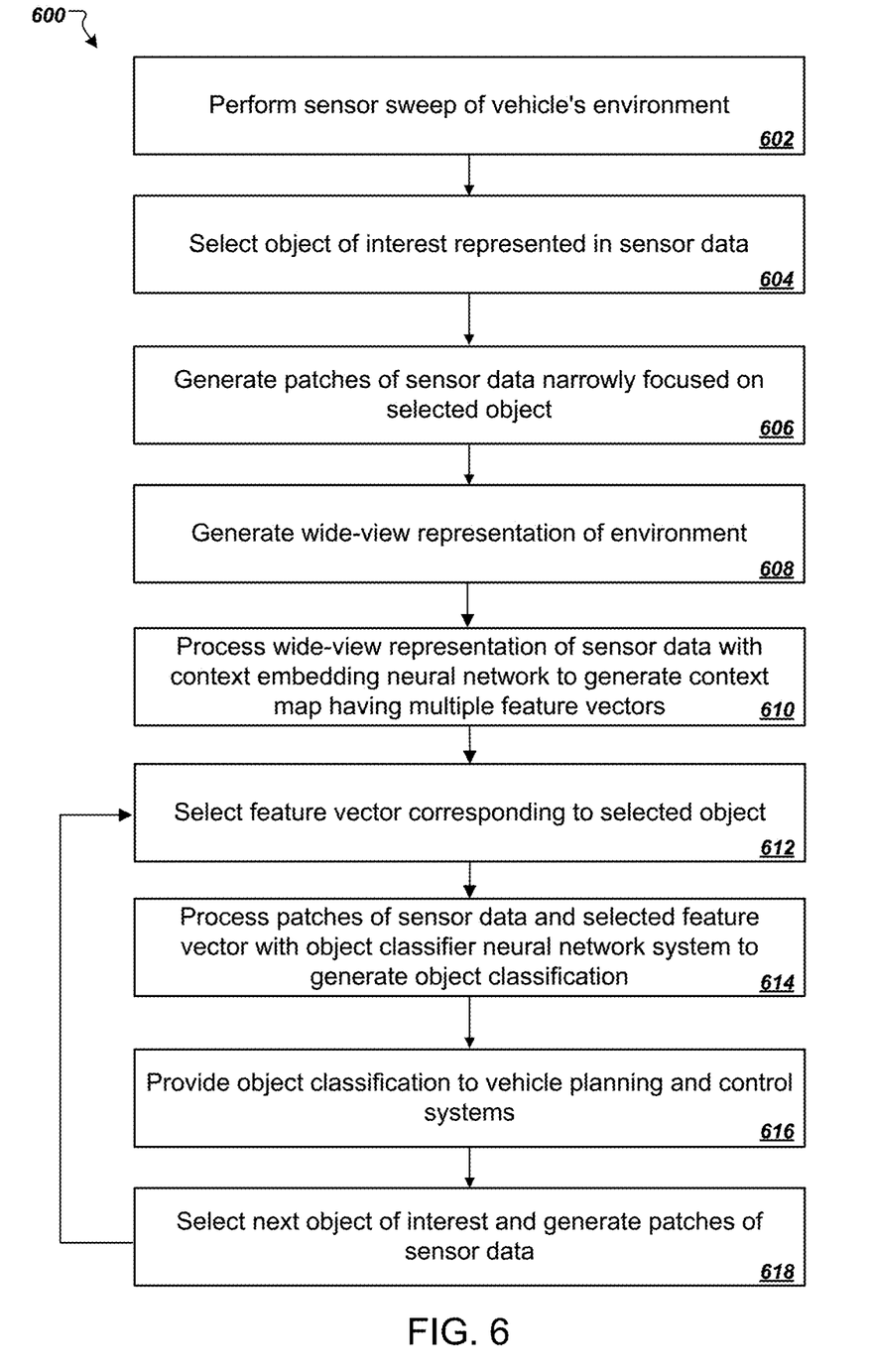
FIG. 6 is a flowchart of an example process for classifying objects in a vicinity of an autonomous vehicle with a neural network system.

FIG. 6 is a flowchart of an example process 600 for classifying an object of interest located nearby an autonomous vehicle. The process 600 can be performed using the systems described in this specification, including on-board system 130 and the neural network system depicted in FIG. 3.

At stage 602, sensor subsystems on the vehicle, e.g., sensor subsystems 304a-n perform a sweep of the vehicle's environment. During the sweep, the sensor subsystems use various technologies to measure and detect information about the environment. For example, one or more LIDAR subsystems may emit electromagnetic radiation and determine the locations of objects in the environment based on attributes of reflections of the emitted radiation that vary with the distance of the object from the vehicle. One or more camera subsystems may capture images of the environment. The sensor subsystems can provide their measurements as sensor data to a sensor subsystem interface and pre-processor, e.g., interface 306.

The sensor data acquired by the sensor subsystems may include indications of multiple objects within a pre-defined distance (e.g., a sensing range) of the vehicle. At stage 604, the system (e.g., interface 306) selects one as an object of interest to be classified. The object of interest may be selected using any suitable criteria, such as a prominence of the object in the sensor data, a proximity of the object to the vehicle, or a combination of these and/or other factors. At stage 606, the system (e.g., interface 306) generates patches from the various channels of sensor data focused on the selected object of interest and formats first neural network inputs representing the patches of the object. At stage 608, the system (e.g., interface 306) generates a wide-view representation of the environment of the vehicle. The wide-view representation encompasses a larger area of the environment than the patches for the object of interest. For example, the wide-view representation may encompass both the object of interest and other objects or areas of the environment that are not depicted in the patches for the object of interest.

At stage 610, a context embedding neural network (e.g., network 308) processes the wide-view representation of the environment to generate a context map. The context map includes a collection of feature vectors, each corresponding to a different region of the environment encompassed by the wide-view representation. Using convolutional layers, the context embedding neural network generates the feature vectors in the context maps so that each feature vector reflects features of all or some of the regions in the wide-view representation of the environment beyond the particular region that the feature vector corresponds to. For example, the feature vector for a top-left region of the environment may depend not only on features in the top-left region but also or alternatively on features in other region of the environment.

At stage 612, the system (e.g., interface 306) selects a feature vector corresponding to the object of interest. The selected feature vector can, for example, be the feature vector from the context map that corresponds to the region where the object of interest is located in the environment. In some cases, the object of interest may straddle multiple regions. When this occurs, the system may select the feature vector corresponding to the region where the major part of the object of interest is located or where the center of the object of interest is located. In some cases, the system may combine all or portions of the feature vectors corresponding to each region where a portion of the object of interest is located rather than selecting just one feature vector. For example, the system may generate a weighted average of the feature vectors.

At stage 614, an object classifier neural network processes the first neural network inputs for the patches describing the sensor measurements of the object of interest, and further processes the selected feature vector, to generate a classification for the object. The predicted object classification can be represented as a single classification (e.g., an indication of the most likely classification from a set of possible classifications such as vehicle, pedestrian, cyclist, road sign, or animal), as a distribution of classifications (e.g., confidence or probability scores for each possible classification), or in any other appropriate representation.

At stage 616, the object classification is made available or provided to other systems on the autonomous vehicle that make planning and control decisions for autonomous operation of the vehicle. For example, the object classification can be provided to a planning system that plans movements of the vehicle, and the planning system can use the object classification to inform how the vehicle should move with respect to the object. For instance, the vehicle may maneuver closer to some types of objects than others, and may move at different speeds relative to particular type of objects. The planning system may be programmed to instruct the vehicle to yield to some other types of vehicles (e.g., emergency vehicles) but not to some others, for example. A control system may thereafter execute the plan using steering, braking, and/or accelerations to drive the vehicle as planned.

In some implementations, the object classification techniques disclosed herein make efficient use of context data in generating object classifications for a set of objects in an environment. When more than one object is located in an environment near an autonomous vehicle, the system can classify each object iteratively or in parallel without needing to re-generate a context map for each object. Instead, a single context map encompassing all the objects that are to be classified can be generated in one pass through the context embedding neural network, and the feature vectors from the single context map can then be used to classify each of the objects. For objects located in different regions of the environment, different corresponding feature vectors can be selected. For example, at stage 618, the system (e.g., interface 306) may select the next object of interest and generate neural network inputs for patches corresponding to the next selected object. The process 600 can return to stage 612 without needing to re-generate the context map, and repeats stages 612-618 until no further objects remain to be classified.

Figure 7:
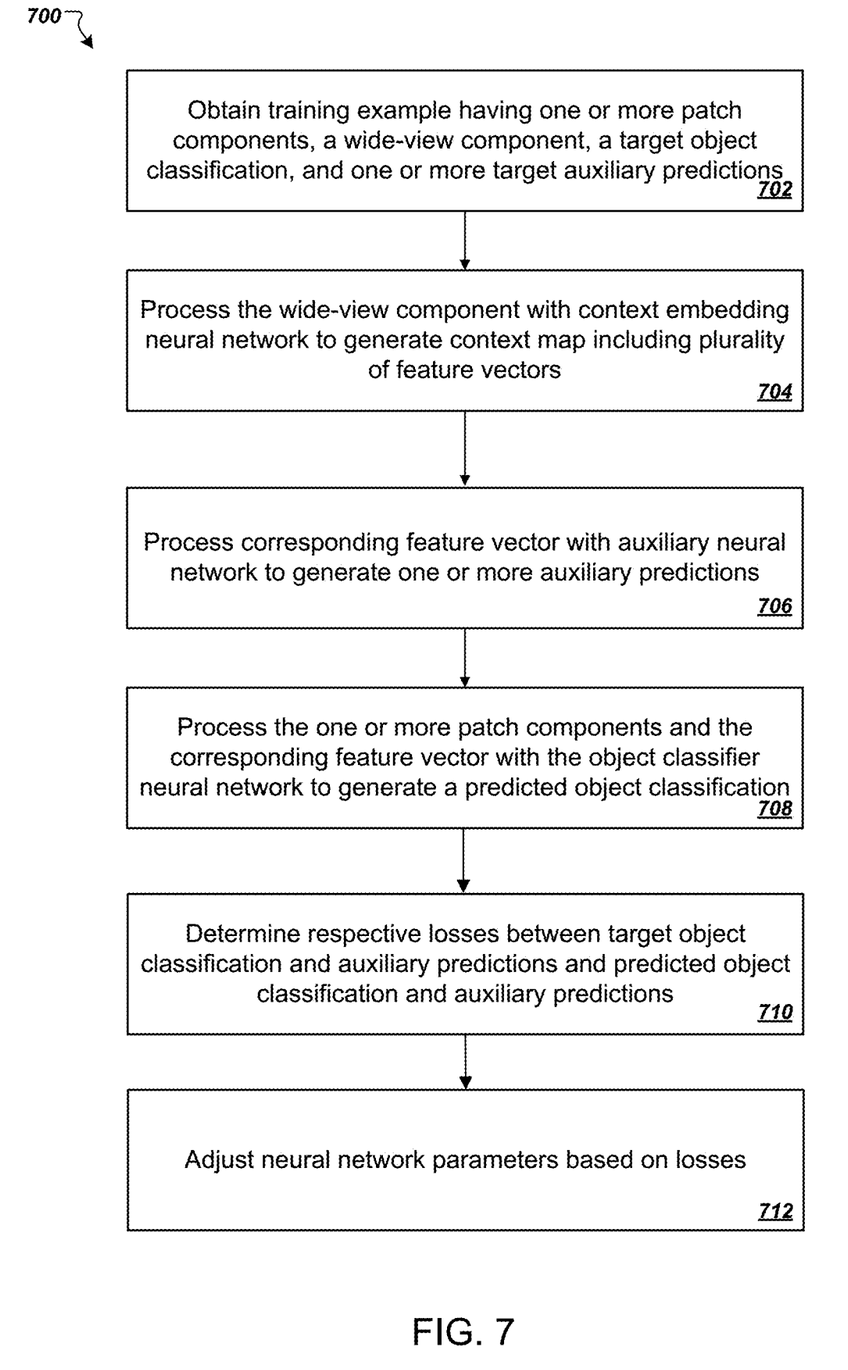
FIG. 7 is a flowchart of an example process for training an object classification neural network system.

FIG. 7 depicts a flowchart of an example process 700 for training an object classifier neural network (e.g., network 302) and a context embedding neural network (e.g., network 308). In some implementations, the process 700 can be carried out by a training system, e.g., training system 110 (FIG. 1). The process 700 describes an approach to jointly training the object classifier neural network and the context embedding neural network. However, in other implementations, the object classifier neural network and the context embedding neural network are trained separately.

The system can generate or otherwise obtain training data having many training examples (702). Each training example includes one or more patch components, which are neural network inputs for patches focused on a particular object of interest; a wide-view component, which is a neural network input for a wide-view representation of the environment of a vehicle that encompasses the object of interest and additional regions of the environment; a target object classification, which is a label representing a true or target classification for the object; and one or more auxiliary predictions, which are labels representing true or target auxiliary predictions for the environment or regions within the environment including regions outside of the region where the object of interest is located (e.g., numbers of various types of objects within each region). Some training examples may include the same wide-view representation but different objects of interest from the environment encompassed by the wide-view representation. The training examples can be manually labeled by humans, can be labeled using earlier trained versions of the objection classifier system, or both, for example.

For a given training iteration, the training system selects a training example and processes the wide-view component with the context embedding neural network in accordance with current values of the parameters (e.g., weights and biases of perceptrons in the network) of the network to generate a context map having a collection of feature vectors corresponding to different regions of the environment encompassed by the wide-view component (stage 704). The training system selects from the context map a feature vector that corresponds to the patch components, e.g., a feature vector corresponding to the region where the object of interest represented in the patches is located. The selected feature vector is processed with the auxiliary neural network, e.g., network 310, in accordance with current values of the parameters of the network to generate auxiliary predictions about the environment (stage 706). Additionally, the object classifier neural network processes the patch components of the training example and the selected feature vector in accordance with current values of the parameters of the network to generate a predicted object classification for the object of interest represented in the object patches (stage 708). The training system can determine losses between both the target object classification and the predicted object classification, and between the target auxiliary predictions and the predicted auxiliary predictions (stage 710). The training system can then adjust the values of the parameters of the object classification neural network, the context embedding neural network, and the auxiliary neural network based on the losses. For example, the values of the parameters can be updated through a stochastic gradient descent process with backpropagation. The object classifier neural network can be updated based on the object classification loss (i.e., the loss based on a difference between the predicted and target object classifications), and the auxiliary neural network can be updated based on the auxiliary prediction loss (i.e., the loss based on a difference between the predicted and target auxiliary predictions), and the context embedding neural network can be updated based on both the auxiliary prediction loss and the object classification loss. Stages 704 and 712 can be repeated for different training examples to train the networks in an iterative process until a training-termination condition occurs.

In some implementations, the context embedding neural network and the object classification neural network are trained separately. For example, the context embedding neural network can first be trained together with the auxiliary neural network by processing wide-view representation training examples and generating auxiliary predictions. The values of the parameters of the context embedding neural network and auxiliary neural network can be updated based on an auxiliary prediction loss. The object classification neural network can then be trained using training examples that include patch components and feature vectors generated by the trained context embedding neural network. The values of the parameters of the context embedding neural network can be fixed while separately training the object classification neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system implemented on one or more data processing apparatuses, comprising:
    an interface configured to obtain, from one or more sensor subsystems, sensor data describing an environment of a vehicle, and to generate, using the sensor data, (i) one or more first neural network inputs representing sensor measurements for a particular object in the environment and (ii) a second neural network input representing sensor measurements for a plurality of regions of the environment, the plurality of regions including one or more regions that encompass the particular object and at least one additional region that does not encompass the particular object and is not represented by the one or more first neural network inputs;
    a convolutional neural network configured to process the second neural network input to generate an output, the output including a first feature vector for a first region of the plurality of regions of the environment where at least a portion of the particular object is located, the first feature vector generated based on data indicated by the second neural network input about (i) the first region of the environment where at least a portion of the particular object is located and (ii) the at least one additional region of the environment that does not encompass the particular object; and
    an object classifier neural network configured to process the one or more first neural network inputs and the first feature vector to generate a predicted classification for the particular object.

2. The system of claim 1, wherein the interface is configured to obtain a plurality of channels of sensor data from a plurality of corresponding sensor subsystems, and different ones of the first neural network inputs represent sensor measurements of the particular object from different ones of the plurality of channels of sensor data.

3. The system of claim 1, wherein the second neural network input represents a projection of at least the portion of the environment that encompasses the plurality of regions including the particular object.

4. The system of claim 3, wherein the projection represented by the second neural network input comprises a projection of a point cloud derived from measurements of a light detection and ranging (LIDAR) sensor subsystem.

5. The system of claim 1, wherein the second neural network input represents one or more camera images having a collective field of view of the environment of the vehicle that is wider than a field of view of the environment represented by the one or more first neural network inputs.

6. The system of claim 1, wherein the object classifier neural network comprises a plurality of channel encoders and a classification portion, each channel encoder configured to independently process a different one of the first neural network inputs to generate an alternative representation of the sensor measurements represented by the first neural network input, the classification portion configured to process the alternative representations from the plurality of channel encoders and the first feature vector to generate the object classification.

7. The system of claim 1, wherein the vehicle is an autonomous vehicle.

8. The system of claim 1, further comprising a planning subsystem configured to process the predicted classification for the particular object and other data to plan a maneuver for the vehicle, wherein the vehicle is configured to perform the maneuver without human control.

9. The system of claim 1, wherein the object classifier neural network is configured to determine scores indicating likelihoods of the particular object being at least two of a vehicle, a pedestrian, a cyclist, a motorcyclist, a sign, a background, or an animal.

10. A method implemented by one or more data processing apparatuses, comprising:
obtaining, from one or more sensor subsystems, sensor data that describes an environment of a vehicle;
generating, using the sensor data, (i) one or more first neural network inputs representing sensor measurements for a particular object in the environment and (ii) a second neural network input representing sensor measurements for a plurality of regions including one or more regions that encompass the particular object and at least one additional region that does not encompass the particular object and is not represented by the one or more first neural network inputs;
processing, with a convolutional neural network, the second neural network input to generate an output, the output including a first feature vector for a first region of the plurality of regions of the environment where at least a portion of the particular object is located, the first feature vector generated based on data indicated by the second neural network input about (i) the first region of the environment where at least a portion of the particular object is located and (ii) the at least one additional region of the environment that does not encompass the particular object; and
processing, with an object classifier neural network, the one or more first neural network inputs and the first feature vector to generate a predicted classification for the particular object.

11. The method of claim 10, wherein processing the one or more first neural network inputs and the first feature vector to generate the predicted classification for the particular object comprises processing, with a plurality of channel encoders of the object classifier neural network, the one or more first neural network inputs to generate one or more alternative representations of the sensor measurements represented by the one or more first neural network inputs.

12. The method of claim 10, further comprising obtaining a plurality of channels of sensor data from a plurality of corresponding sensor subsystems, wherein different ones of the first neural network inputs represent sensor measurements of the particular object from different ones of the plurality of channels of sensor data.

13. The method of claim 10, further comprising using the predicted classification for the particular object to plan a maneuver for the vehicle, and performing the maneuver with the vehicle according to the plan.

14. The method of claim 10, further comprising selecting, from among a plurality of feature vectors included in the output of the convolutional neural network, the first feature vector for use in generating the predicted classification for the particular object based on a correspondence between the first feature vector and a region of the environment where at least a portion of the particular object is located.

15. One or more non-transitory computer-readable media encoded with instructions that, when executed by one or more data processing apparatuses, cause performance of operations comprising:
obtaining sensor data that describes an environment of a vehicle;
generating, using the sensor data, (i) one or more first neural network inputs representing sensor measurements for a particular object in the environment and (ii) a second neural network input representing sensor measurements for a plurality of regions including one or more regions that encompass the particular object and at least one additional region that does not encompass the particular object and is not represented by the one or more first neural network inputs;
processing, with a convolutional neural network, the second neural network input to generate an output, the output including a first feature vector for a first region of the plurality of regions of the environment where at least a portion of the particular object is located, the first feature vector generated based on data indicated by the second neural network input about (i) the first region of the environment where at least a portion of the particular object is located and (ii) the at least one additional region of the environment that does not encompass the particular object; and
processing, with an object classifier neural network, the one or more first neural network inputs and the first feature vector to generate a predicted classification for the particular object.

* * * * *